UNITED STATES PATENT OFFICE.

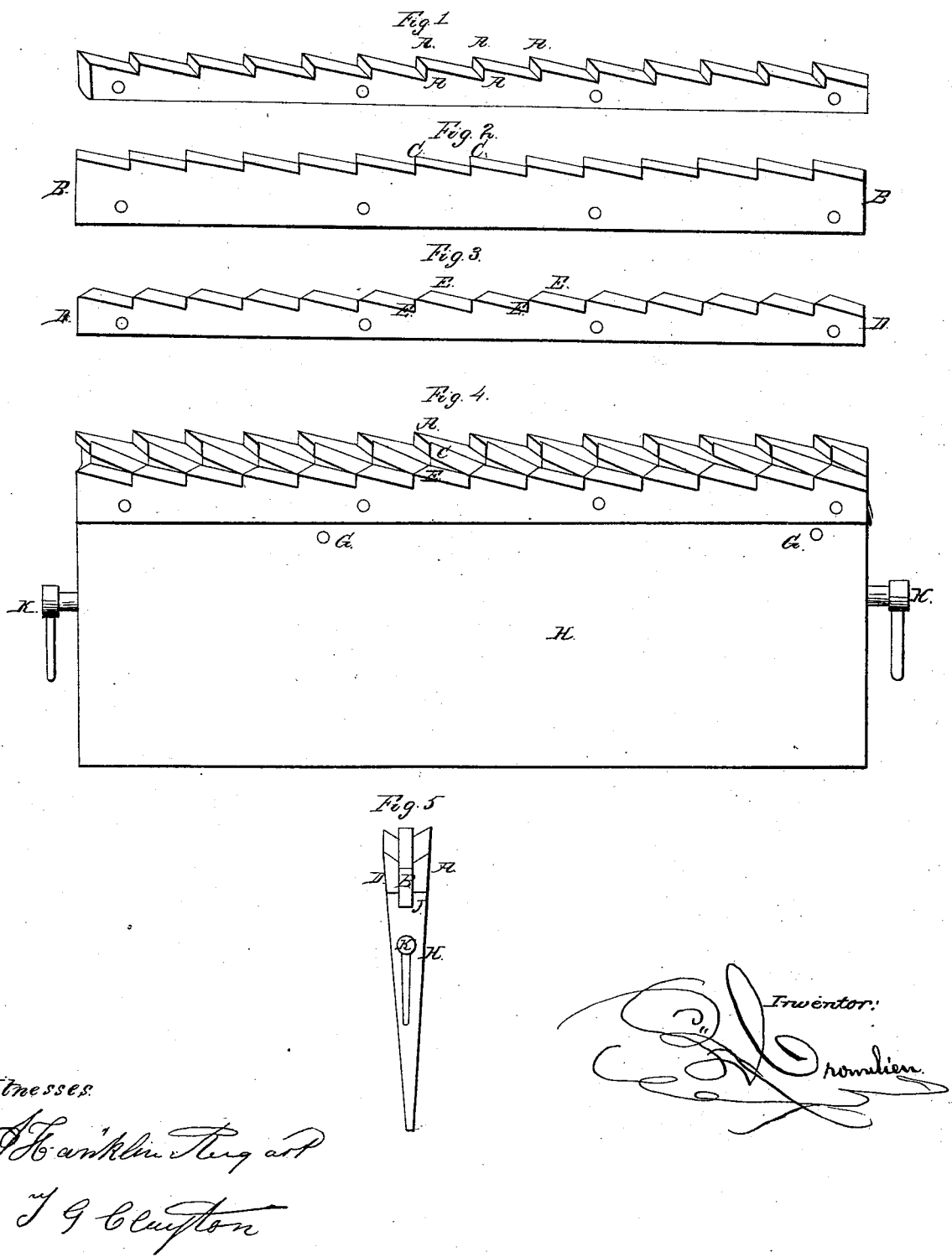

ROWLAND CROMELIEN, OF WASHINGTON, DISTRICT OF COLUMBIA.

IMPROVEMENT IN SAWS.

Specification forming part of Letters Patent No. 46,996, dated March 28, 1865.

*To all whom it may concern:*

Be it known that I, ROWLAND CROMELIEN, of the city of Washington and District of Columbia, have invented a new and useful Improvement in Saws for Sawing Forest Trees; and I do hereby declare that the following is a full and exact description thereof, reference being had to the accompanying drawings and to the letters of reference marked thereon, making a part of this specification.

The nature of my invention consists in the arrangement, construction, and combination of three saws fastened to a blade, altogether forming a wedge-shaped saw which I style "Rowland Cromelien's Wedge-Shaped Lumber-Saw."

To enable others skilled in the art to make and use my invention, I will proceed to describe its construction, as follows:

Figure 1 represents the right-hand blade; Fig. 2 the center blade; Fig. 3 the left-hand blade; and Fig. 4 the three blades attached together, forming a V or wedged shaped saw. Fig. 5 represents an end view.

I make my saw-blades in size from one to two inches wide at the teeth, and use small or large saws, according to the size of the trees to be sawed.

Fig. 1 shows the shape of the right-hand blade, with the teeth A filed inclining at an angle to the center blade, B. The center blade, B, has the front part of its teeth filed vertically square, as shown at C, and the blade B is larger in depth than the side blades. The left hand blade, D, as shown at Fig. 3, has its teeth filed at an angle inclining also to the center blade, B, as shown at E. The three blades are then screwed together, as seen at Fig. 4, and they are permanently fastened by screws G to a wedge-shaped back blade, H, which is made of iron or wood, having a groove, J, as seen at Fig. 5, in which the center blade, B, is set and fitted firmly. K represents handles attached at each end, in any manner most convenient for use when worked by hand.

The object and advantage of this invention is arranging the teeth (of three blades) set at any angle best suited for the purpose, and to more effectually clean out the sawdust, as its wedge shape frees the saw and prevents its choking or working tight and hard—and two men with this saw can fell more trees than six men can with axes—and by the arrangement of the three ranges or blades it is easily taken apart for sharpening, when required, and the placing of teeth between teeth at proper angles enables the operator to cut the tree straight across or in a slope downward, lessening the height of the stumps, so that the stumps will sooner decay and rot than by the use of axes.

If the wedge is made of one entire piece of iron, in the shape described by me, either one inch, one and a half or two inches thick for the thick part of said wedge or V, then in such event screw-holes are drilled in such wedge for each steel saw-blade separate, under which teeth is a screw which fits in said holes, and thus permanently secures them fast to the iron wedge.

The part under the teeth being the back part of the blade of the saw, either made of hard wood or iron, should be from about six to ten inches wide, as seen at letter H.

What I claim as my invention, and desire to secure by Letters Patent, is—

The arrangement, formation, and combination of three saw-blades, with their teeth filed and arranged at any angle required, and fastened firmly to a wedge or V-shaped back, as herein described, and for the purposes set forth.

RD. CROMELIEN.

Witnesses:
T. G. CLAYTON,
J. FRANKLIN RIEGART.